3,344,030
REINFORCED DIRECTLY COMPRESSED NON-
GRANULATED PHARMACEUTICAL CRYSTAL-
LINE LACTOSE TABLETS
Robert T. Stevens, Drexel Hill, and Marvin Hersh, Philadelphia, Pa., assignors to American Home Products Corporation, New York, N.Y., a corporation of Delaware
No Drawing. Filed June 15, 1964, Ser. No. 375,297
7 Claims. (Cl. 167—82)

This invention relates to a novel process which permits the successful direct compression of conventionally processed lactose. More particularly, our novel method allows direct compression of conventionally processed lactose without prior wet granulation.

In the pharmaceutical industry it is a well known fact that very few crystalline or powdered materials can be directly compressed into suitable tablets on standard automatic tableting equipment. This is particularly true in the case of conventionally processed lactose which has heretofore been considered incompressible unless previously wet granulated or spray dried.

At the present time there are two well known methods for preparing compositions comprising crystalline lactose namely, the wet granulation method and the dry method, which is also known as "slugging." The wet method has the following eight separate and distinct production operations:

(1) Powder blend
(2) Prepare binder solution
(3) Mix
(4) Screen
(5) Dry
(6) Rescreen
(7) Blend with lubricant
(8) Compress On the other hand, the dry method has the following six steps:

(1) Powder blend
(2) Slug
(3) Grind with slug
(4) Sieve out fines and reslug
(5) Blend with lubricant and disintegrating agent
(6) Compress In both these methods the amount of equipment, labor, floor space and time required is substantial. The preparation of tablets comprising an active agent, conventionally processed lactose and fibrous reinforcing agent by direct compression would involve only two essential steps:

(1) Powder blend preparation
(2) Compression

The production cost savings from direct compaction are significant and obvious. As compared with the wet method for instance, a suitable technique for preparing tablets including crystalline lactose would eliminate the necessity for, first, separately preparing a binder solution, granulating, screening, drying rescreening, and separately blending with a lubricant and disintegrating agent. As compared with the dry method, direct compression would eliminate the necessity of slugging, grinding the slug, reslugging and blending with a lubricant and disintegrating agent. Moreover, a direct compacted tablet mixture employing crystalline lactose disintegrates more rapidly than a direct compacted tablet from the same mixture but employing spray dried lactose as is illustrated below.

In accordance with the present invention, therefore, a method is now provided whereby medicinal tablets can be satisfactorily prepared using conventional crystalline lactose as an excipient by direct compression on conventional automatic tableting equipment.

By direct compression is meant the direct compaction between two punches and without previous processing beyond simple mixing, of a powder into tablets in a die cavity filled loosely with a large number of small crystals. As the upper punch descends and makes contact with the surface crystals, a densification of the bed occurs through particle movement, void spaces being filled by migrating or elastically deformed crystals. Cold bonding may occur at those contact points where two lattices are correctly aligned. When maximum pressure is applied, we have a compact aggregate approaching the density of the original crystals. The primary purpose of such direct compression is to reduce manufacturing cost and to improve or promote such necessary properties as tablet strength, appearance and disintegration.

Crystalline lactose or milk sugar is the most desirable excipient known in the manufacture of medicinal tablets due to its combination of chemical and pharmacological inertness, low hygroscopicity, neutral pH and slight sweetish taste, pure white color and low cost. However, heretofore, it had long been established that the direct compression of conventionally processed crystalline lactose was impossible. Hence, recourse to the long tedious processing outline above was considered necessary to obtain formulations having adequate compression characteristics. Alternatively, the lactose was spray dried.

Although rendered satisfactory for direct compression, spray dried lactose has its own drawbacks. As reported by Brownley & Lachman, J. Pharm. Sciences, vol. 53, p. 452, spray-dried lactose is contaminated with 5-(hydroxymethyl)-2-furaldehyde, an impurity present in the lactose mother liquor which is removed by the crystallization process employed in the manufacture of standard crystalline lactose, but is *not* removed during the process of spray drying. This impurity causes tablets prepared with spray-dried lactose, in many cases, to suffer a serious degree of surface discoloration on storage after manufacture.

Another disadvantage of spray-dried lactose is that it is prone to undergo a loss of its compression characteristics upon aging. Such aged material, having been mixed with active drug and failed of compression, cannot be salvaged by repeated compression because additional processing results in disruption of the fragile hollow spheres or granules with further loss of compression qualities. This phenomenon consequently adds considerable uncertainty to the process of tablet manufacture using spray-dried lactose.

Accordingly, the primary object of the invention is to disclose a means for the use of conventionally processed crystalline lactose in the direct compression of an improved pharmaceutical tablet.

The invention is based on the discovery of a means for tableting pharmaceuticals by the use of crystalline lactose combined with a fibrous reinforcing agent. Suitable reinforcing agents such as, methylcellulose, orange flour, alpha cellulose or carboxymethylcellulose in the range of about 2 to 30% by weight and preferably 5 to 15% by weight will permit the use of the crystalline lactose.

The following tabular comparison of conventionally processed lactose versus spray dried lactose shows the improved tablet characteristics obtained with the use of this process with fibrous reinforced conventionally processed lactose:

TABLE I.—PHYSICAL TEST RESULTS WITH METHYLCELLULOSE AT VARYING PERCENTAGES

|  | Conventionally Processed Lactose, Percent of Methylcellulose | | | | | | Spray Dried Lactose, Percent of Methylcellulose | | | | | |
| --- | --- | --- | --- | --- | --- | --- | --- | --- | --- | --- | --- | --- |
|  | 0.0 | 5.0 | 10.0 | 15.0 | 20.0 | 30.0 | 0.0 | 5.0 | 10.0 | 15.0 | 20.0 | 30.0 |
| Hardness, kg | 15 | 19 | 22 | 23 | 25 | 30 | 22 | 25 | 26 | 26 | 25 | 23 |
| Thickness, Inch | .143 | .144 | .145 | .146 | .147 | .148 | .143 | .145 | .146 | .148 | .150 | .150 |
| Friability, k | 1.00 | 0.02 | 0.02 | 0.01 | 0.01 | 0.01 | 0.10 | 0.20 | 0.30 | 0.30 | 0.50 | 0.50 |
| Disintegration (Minutes) | 1.45 | 0.90 | 1.60 | 1.77 | 3.00 | 6.00 | 28.0 | 20.0 | 18.8 | 18.8 | 18.5 | 29.3 |

TABLE II.—PHYSICAL TEST RESULTS WITH ALPHA CELLULOSE AT VARYING PERCENTAGES

|  | Conventionally Processed Lactose, Percent of Alpha Cellulose | | | | | | Spray Dried Lactose, Percent of Alpha Cellulose | | | | | |
| --- | --- | --- | --- | --- | --- | --- | --- | --- | --- | --- | --- | --- |
|  | 1.0 | 5.0 | 10.0 | 15.0 | 20.0 | 30.0 | 0.0 | 5.0 | 10.0 | 15.0 | 20.0 | 30.0 |
| Hardness, kg | 15 | 17 | 20 | 22 | 24 | 26 | 22 | 23 | 24 | 24 | 20 | 18 |
| Thickness, Inch | .144 | .145 | .146 | .147 | .148 | .149 | .143 | .144 | .146 | .148 | .149 | .150 |
| Friability, k | 1.00 | 0.08 | 0.07 | 0.07 | 0.06 | 0.06 | 0.20 | 0.20 | 0.30 | 0.40 | 0.50 | 0.80 |
| Disintegration (Minutes) | 1.46 | 1.00 | 1.20 | 2.00 | 2.90 | 5.50 | 29.0 | 22.0 | 19.0 | 19.0 | 18.9 | 22.0 |

Mixed powders were dry blended for 7 minutes and compressed on a standard rotary tablet press using conventional force feed techniques and using a ⅜″ diameter, flat beveled, scored top punch.

As will be observed from the preceding tabulated data the combination of crystalline lactose with either methylcellulose (as in Table I) or with alpha cellulose (as in Table II) dramatically increases the rate of disintegration of the tablets formed as compared with that of those tablets manufactured with spray dried lactose. In all other material respects such as hardness, and friability for example the products remain the same.

The importance of this discovery can be seen from the fact that if any medicinal aggregate is to function as a good carrier for a pharmaceutical product it will, of course, have to release its contents rapidly when placed in water. The only condition necessary for this to happen is that water must penetrate into the interior of the aggregate. One must bear in mind that the interparticular bonds are highly strained and possess higher solubility than the particles themselves. Thus in the presence of a water solution phase transfer will be established whereby the strained bonds in the compactions will dissolve and the individual crystals will grow. The bonds holding the crystals into a firm compact will thus be destroyed and the tablet will simply fall apart.

The following examples are set forth for purposes of illustrating the method for preparing sedative tablets by direct compression of compositions containing crystalline lactose and a fibrous reinforcing agent in accord with the present invention. These several examples of illustrative embodiments are not to be construed as limiting the scope of this invention which may only be determined by reference to the several appended claims.

EXAMPLE I

*(Yellow colored tablet)*

|  | Percent |
| --- | --- |
| Active ingredient | 5.00 |
| Conventional processed lactose | 85.95 |
| Methylcellulose | 5.70 |
| F.D.&C. Yellow #5 Lake | 1.15 |
| Suitable lubricant | 2.20 |
|  | 100.00 |

Mix all ingredients 5 minutes; comminute to obtain a 60 mesh granule, remix 7 minutes, compress, using conventional force feed technique.

EXAMPLE II

*(82% adds tablet)*

|  | Percent |
| --- | --- |
| Active ingredient I | 57.40 |
| Active ingredient II | 11.70 |
| Conventionally processed lactose | 18.90 |
| Methylcellulose | 10.00 |
| Suitable lubricant | 3.00 |
|  | 100.00 |

Comminute active ingredient I to obtain a #40 mesh granule, sieve lubricant through a #60 screen, add all remaining ingredients, mix 7 minutes, compress.

EXAMPLE III

*(52% adds tablet)*

|  | Percent |
| --- | --- |
| Phenobarbital powder | 37.00 |
| Conventionally processed lactose | 47.70 |
| Alpha cellulose | 13.00 |
| Suitable lubricant | 2.30 |
|  | 100.00 |

Sieve lubricant through a #60 screen, add remaining ingredients, mix 7 minutes, compress.

EXAMPLE IV

Tranquilizer tablets having the following composition and intended to contain 10 mg. or 15 mg. each of active ingredient were prepared by direct compression in the following manner:

*(a) 10 mg. tablets*

| Ingredient | Per tablet, mg. | Per 100,000 tablets, kg. |
| --- | --- | --- |
| (7-chloro-1,3-dihydro-3-hydroxy-5-phenyl-2H-1,4-benzodiazepin-2-one) | 10.0 | 1.00 |
| Methylcellulose, U.S.P., 400 cps | 30.0 | 3.00 |
| Amberlite XE-88 | 3.0 | 0.30 |
| F.D.&C. Yellow #5 Lake | 0.4 | 0.04 |
| Magnesium Stearate, U.S.P | 1.5 | 0.15 |
| Lactose, U.S.P | 145.1 | 14.51 |
| Total Weight | 190.0 | 19.00 |

(b) 15 mg. tablets

| Ingredient | Per tablet, mg. | Per 100,000 tablets, kg. |
|---|---|---|
| (7-chloro-1,3-dihydro-3-hydroxy-5-phenyl-2H-1,4-benzodiazepin-2-one) | 15.0 | 1.50 |
| Methylcellulose, U.S.P., 400 cps | 30.0 | 3.00 |
| Amberlite XE-88 | 3.0 | 0.30 |
| F.D.&C. Yellow #5 Lake | 1.9 | 0.19 |
| Magnesium Stearate, U.S.P | 1.5 | 0.15 |
| Lactose, U.S.P | 138.6 | 13.86 |
| Total Weight | 190.0 | 19.00 |

All of the ingredients of each of the above formulations except the active ingredient were passed through a 30 mesh screen and were blended together and milled through a hammer mill to ensure uniformity. The (7-chloro-1,3-dihydro-3-hydroxy-5-phenyl - 2H - 1,4 - benzodiazepin-2-one) previously passed through a 30 mesh screen was then added and the blend directly compressed into 8/32" tablets on a rotary tablet punch.

EXAMPLE V

Anti-depressant tablets having the following composition:

| Ingredient | Amount (mg.) | |
|---|---|---|
| 1-(gamma-diethylaminopropyl)-2,3-hexamethyleneindole] | 15.0 | 30.0 |
| Magnesium Stearate, U.S.P | 5.0 | 5.0 |
| Methylcellulose 400 cps., U.S.P | 15.0 | 15.0 |
| F.D.&C. Red #3 | | 0.5 |
| F.D.&C. Yellow #5 | 0.0366 | |
| Lactose Pwd., U.S.P | (¹) | 150.0 |

¹ Q.s. ad 150.0 mg.

The ingredients were dry blended together, passed through an 80 mesh screen and directly compressed into tablets on a rotary tablet punch.

Various changes and modifications of the invention can be made and to the extent that such variations incorporate the spirit of the instant invention they are intended to be included within the scope of the several appended claims.

We claim:

1. A method for the preparing of medicament containing tablets in finished dosage form which are capable of rapid release of active ingredients which comprises directly compressing to a tablet hardness of up to about 30 kg. a non-granulated pharmaceutical composition screened to 30 to 80 mesh consisting of a mixture of up to about 70% by weight of active ingredient, a small but effective amount, up to about 3% by weight, of a tablet lubricant, from about 18% to about 86% by weight of U.S.P. crystalline lactose and from about 2% to about 30% by weight of a fibrous reinforcing agent selected from the group consisting of alpha cellulose, ethers of cellulose and orange flour.

2. A method according to claim 1 wherein the fibrous reinforcing agent is methyl cellulose.

3. A method according to claim 1 wherein the fibrous reinforcing agent is alpha cellulose.

4. A method according to claim 1 wherein said active ingredient is phenobarbital.

5. A method according to claim 1 wherein said active ingredient is 7-chloro-1,3-dihydro-3-hydroxy-5-phenyl-2H-1,4-benzodiazepin2-one.

6. A method according to claim 1 wherein said active ingredient is [1-(gamma-diethylaminopropyl)-2,3-hexamethyleneindole].

7. A non-granulated directly compressed pharmaceutical composition in tablet dosage form consisting of a mixture of up to about 70% by weight of active ingredient, a small but effective amount, up to about 3% by weight, of a tablet lubricant, from about 18% to about 86% by weight of U.S.P. crystalline lactose and from about 2% to about 30% by weight of a fibrous reinforcing agent selected from the group consisting of alpha cellulose, ethers of cellulose and orange flour.

References Cited

UNITED STATES PATENTS

| | | | |
|---|---|---|---|
| 1,541,744 | 6/1925 | Wiseman | 167—82 |
| 2,851,453 | 9/1958 | Kennon et al. | 167—82 XR |
| 3,015,611 | 1/1962 | Smedresman | 167—82 |
| 3,079,303 | 2/1963 | Raff et al. | 167—82 |
| 3,116,204 | 12/1963 | Siegel et al. | 167—82 XR |
| 3,146,168 | 8/1964 | Battista | 167—82 |
| 3,181,998 | 5/1965 | Kanig | 167—82 |

OTHER REFERENCES

Chem. Abstracts 58(7): 6651a, Apr. 1, 1963.

LEWIS GOTTS, *Primary Examiner.*

S. K. ROSE, *Assistant Examiner.*